United States Patent [19]
Godbey

[11] Patent Number: 5,413,679
[45] Date of Patent: May 9, 1995

[54] METHOD OF PRODUCING A SILICON MEMBRANE USING A SILICON ALLOY ETCH STOP LAYER

[75] Inventor: David J. Godbey, Burtonsville, Md.

[73] Assignee: The United States of America as represented by the Secretary of the Navy, Washington, D.C.

[21] Appl. No.: 83,952

[22] Filed: Jun. 30, 1993

[51] Int. Cl.⁶ ............................................. B44C 1/22
[52] U.S. Cl. .................................. 216/99; 216/52; 216/51
[58] Field of Search ............... 437/974, 135, 148, 243; 156/647, 630, 662, 630

[56] References Cited

U.S. PATENT DOCUMENTS

| | | | |
|---|---|---|---|
| 4,372,803 | 2/1983 | Gigante | 156/626 |
| 4,463,336 | 7/1984 | Black | 338/4 |
| 4,601,779 | 7/1986 | Abernathey | 156/628 |
| 4,721,938 | 1/1988 | Stevenson | 338/4 |
| 4,784,721 | 11/1988 | Holmes | 156/647 |
| 4,851,080 | 7/1989 | Howe | 156/647 |
| 4,889,590 | 12/1989 | Tucker | 156/647 |
| 4,978,421 | 12/1990 | Bassous | 156/645 |
| 5,013,681 | 5/1991 | Godbey | 437/86 |
| 5,068,203 | 11/1991 | Logadon | 437/89 |

OTHER PUBLICATIONS

Krist, Godbey and Green, "Selective removal of Si 0.7 Ge 0.3 layer from Si(100)", Apply Physic, Let. 58(17), 29 Apr. 1991, pp. 1899–1901.

Narozny, Hamacher, Dambkes, Kibbel and Kasper, "Si/Si/Ge Heterojuction bipolar transistor with graded gap Si Ge base made by molecular beam epitaxy" 1988 IEEE, pp. 562–565.

Primary Examiner—R. Bruce Breneman
Assistant Examiner—Joni Y. Chang
Attorney, Agent, or Firm—Thomas E. McDonnell; Barry A. Edelberg

[57] ABSTRACT

A method of producing a silicon membrane has a step of forming an etch stop layer on an upper surface of a silicon substrate having lower and upper opposing surfaces, the etch stop layer comprising an alloy of silicon and at least one other Group IV element. The method of producing a silicon membrane has another step of forming a cap layer on the etch stop layer, the cap layer having lower and upper opposing surfaces with the lower surface contacting the etch stop layer. The method of producing a silicon membrane has a further step of removing a portion of the silicon substrate at a time when the upper surface of the cap layer is exposed, the portion of the silicon substrate being removed extending from the upper surface of the silicon substrate to the lower surface of the silicon substrate to thereby define an exposed portion of the etch stop layer. The exposed portion of the etch stop layer may be removed. Also, the formed membrane can be further processed to define undoped device structures isolated by thin silicon legs. According to another embodiment, a cap layer is never formed and the etch stop layer itself functions as the membrane.

20 Claims, 4 Drawing Sheets

METHOD OF PRODUCING A SILICON MEMBRANE USING A SILICON ALLOY ETCH STOP LAYER

BACKGROUND OF THE INVENTION

1. Field of the Invention

The present invention relates to a method of forming membranes in general, and, more specifically, to a method of forming silicon membranes in which a silicon device is to be formed.

2. Description of the Related Art

In the past, thin silicon membranes suspended by a substrate, such as a silicon substrate, have been used in several fields. These fields include x-ray lithography in which a thin suspended silicon membrane, which is transparent to X rays, is coated with a metal such as gold. The coated membrane is then used as a mask for X rays.

Thin silicon membranes have also been used for specialty electronic devices such as air bridges in fast transistors. Another example of such specialty electronic devices is a balometer, which detects single photons to measure heat, for example an x-ray balometer.

Among the prior methods of forming silicon membranes is a method in which a silicon boron layer is formed on a silicon substrate. A silicon cap layer is then formed on the silicon boron layer. A portion of the silicon substrate is then removed by etching, with the silicon boron layer serving as an etch stop. Finally, the silicon boron layer may or may not be removed to form a silicon membrane.

There are several problems associated with using silicon boron as the etch stop layer in forming silicon membranes. For example, it is sometimes necessary that the silicon membrane be as free as possible from impurities. In fact, intrinsic silicon is often desired. However, boron, because it is a fast diffuser in silicon, easily diffuses into the silicon membrane 7 leaving a residual impurity after the silicon boron layer is removed.

A further problem is encountered when the silicon membrane is used to form certain specialty electronic devices requiring intrinsic silicon of high carrier mobility. Since boron is a p-type dopant in silicon, the residual boron doped tail must be removed in a further processing step.

Still further, if the silicon membrane is crystalline and a high level of boron impurities is present, the crystal lattice is subjected to stresses that may cause the formation of dislocations in the material. Furthermore, for the silicon boron layer to function as an effective etch stop, the silicon must be doped with boron to at least $1 \times 10^{20}$ atoms/cm$^3$, with a resulting boron concentration of at least 0.2%. With this high concentration of boron, the likelihood of boron diffusing into the silicon membrane is high.

U.S. Pat. No. 5,013,681, which has the same Assignee as, and a common inventor with, the present invention, proposes using a silicon germanium etch stop layer in the formation of silicon on insulator substrates. However, such a silicon germanium etch stop layer has never been proposed in the processing field which concerns, for example, x-ray lithography, or in the specialty electronics field of balometers and the like.

SUMMARY OF THE INVENTION

Accordingly, it is an object of the present invention to provide a method of forming a silicon membrane which is free from impurities.

It is a further object of the present invention to provide a method of forming a silicon membrane which is undoped and does not cause phonon scattering when used to form devices such as balometers.

It is a still further object of the invention to provide a method of forming a silicon membrane which is not subjected to internal stresses to the degree as are those of the prior art.

According to the present invention, a silicon germanium layer (or alloy layer of silicon and at least one other group IV element) is used as the etch stop layer in forming a silicon membrane. Alternatively, the silicon germanium layer itself may be used as the membrane. The germanium atom is larger than the silicon atom, and germanium is therefore not as free to diffuse into the silicon cap layer.

Germanium impurities in the silicon lattice put the adjacent silicon atoms in compression because the germanium atom is larger than the silicon atom. However, because the silicon germanium etch stop layer results in fewer impurities in the silicon membrane, the silicon membrane is not subjected to internal stresses to the same degree as a prior art membrane.

BRIEF DESCRIPTION OF THE DRAWINGS

The accompanying drawings illustrate several aspects of the present invention, and together with the detailed description, serve to explain the principles of the present invention. Throughout the drawings, like numerals depict like elements. In the drawings.

DETAILED DESCRIPTION OF THE PREFERRED EMBODIMENT(S)

Figure 1A:
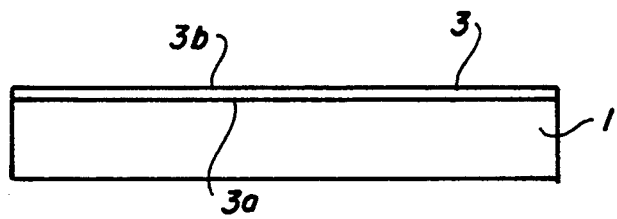
FIG. 1A is a cross-sectional view of an etch stop layer deposited on a silicon substrate according to a first embodiment of the present invention.

According to a first embodiment of the present invention, an etch stop layer 3 itself is used as the thin supported membrane. As shown in FIG. 1A, the etch stop layer 3 is first formed on an upper surface of a silicon substrate 1. This is done by chemically cleaning the silicon substrate (wafer) 1 using a standard cleaning procedure. The cleaned substrate 1 is then loaded into a conventional system capable of growing epitaxial silicon or germanium. Both molecular beam epitaxy (MBE) and chemical vapor deposition (CVD) are currently viable means of epitaxial growth. Following a brief degassing and loading of the substrate 1 into the growth chamber, the silicon oxide present is conventionally removed in situ, typically by heating to 700°–1100° C. When MBE is used as the growth means, the temperature is preferably 750°–950° C., and most preferably, 800°–900° C. Oxide removal is also possible by heating in a silicon flux (for MBE processes), by bombardment by noble gas ions (for MBE processes), or by heating in $H_2$ flux (for CVD processes).

If desired, a silicon buffer may then be conventionally grown on the silicon substrate 1. This step is not shown in the figures. The silicon buffer layer helps to obtain a smooth silicon surface with no pitting or holes. This buffer layer may be grown, for example, at approximately 650° C., with a thickness of 100 Å to 1.0 μm thick.

The etch stop layer 3 is now grown on the buffer layer, if present, or on the silicon substrate 1. The etch stop layer 3 can be grown by conventional techniques, such as molecular beam epitaxy or chemical vapor deposition. These growth techniques are well developed and generate a sharp silicon/alloy interface. The etch stop layer 3 may be $Si_{1-x}Ge_x$ alloy, where x is typically about 0.1 to about 0.5. More preferably, x is about 0.20 to about 0.4, and most preferably, the etch stop layer 3 is a $Si_{0.7}Ge_{0.3}$ alloy, and is grown at about 400° to about 900° C.

Although the etch stop layer 3 is described above as being a silicon germanium alloy, etch stop layer 3 can be an alloy of silicon and any other Group IV element (carbon, germanium, tin, or lead). The etch stop layer 3 has lower (3a) and upper (3b) opposing surfaces with the lower surface 3a contacting the silicon substrate 1.

Figure 1B:
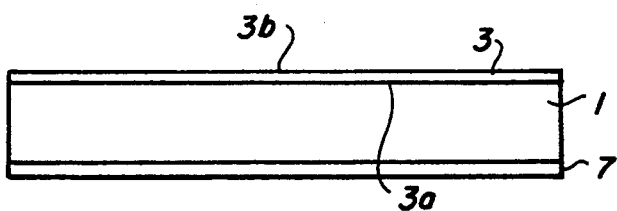
FIG. 1B is a cross-sectional view of the structure of FIG. 1A after a mask has been deposited on a lower surface of the silicon substrate according to the first embodiment of the present invention.
Figure 1C:
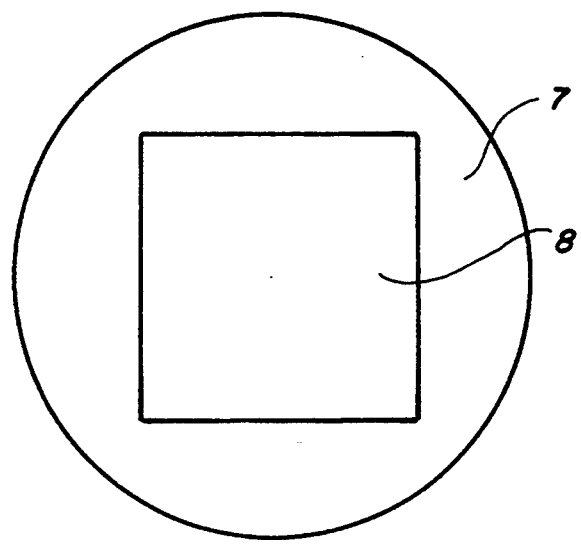
FIG. 1C is a bottom plan view showing the structure of FIG. 1B after a portion of the lower surface of the silicon substrate has been exposed through the mask according to the first embodiment of the present invention.
Figure 1D:
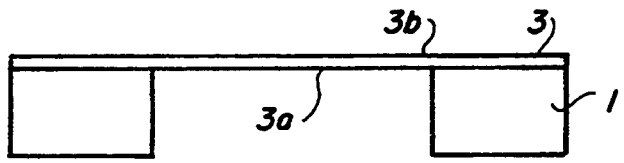
FIG. 1D is a cross-sectional view of the structure of FIG. 1C after a portion of the silicon substrate has been removed according to the first embodiment of the present invention.

Following the step of forming an etch stop layer 3 on the silicon substrate 1, a portion of the silicon substrate 1 is removed. This can be done by several different conventional methods. As shown in FIG. 1B, it can be accomplished by depositing a mask layer 7 on the lower surface of the silicon substrate 1 with a conventional technique. The mask may be silicon oxide, silicon nitride, or a metal, for example. The mask may be defined by depositing a photoresist thereon. Any one of a variety of commonly available photoresists can be used, including a 1400-26 Shipley TM brand photoresist. Then, the photoresist 7 is exposed and developed by conventional techniques to define an exposed portion of the mask 7. The mask is defined through the photoresist using a buffered oxide etch, for example. Portion 8 of the lower surface of the silicon substrate 1 is exposed through the mask layer 7. Mechanical polishing can be used to remove the majority of the silicon. Alternatively, chemical techniques may be used initially. For example, hydrofluoric-nitric-acetic (HNA) solution, or KOH, as a possible first etch, may be introduced onto the exposed portion of the lower surface of the silicon substrate 1. The use of HNA is discussed in Muraoka et al. in a chapter entitled "Controlled Preferential Etching Technology" appearing in the book *Silicon Semiconductor* 1973, incorporated herein by reference in its entirety for all purposes. When the chemical technique is used, the first etch removes the majority of the silicon substrate, leaving approximately 1–2 μm of silicon below the etch stop layer 3. After the initial chemical or mechanical technique, the silicon substrate 1 is cleaned and placed into a selective etch bath. The remaining silicon substrate 1 to be removed is stripped away by a selective etchant (second etch) composed of, for example, 100 g KOH, 4 g $K_2Cr_2O_7$ and 100 ml. propanol in 400 ml. of water at 25° C. in a temperature controlled rotary etch system. This second etch is described in P. Narozny et al, "Si/SiGe Heterojunction Bipolar Transistor with Graded Gap SiGe Base Made by Molecular Beam Epitaxy" IEEE Journal, August 1988, pages 562–565, which is hereby incorporated by reference in its entirety for all purposes. The resulting structure is shown in FIG. 1D. Because the object of the method is to form a suspended membrane, the silicon substrate 1 is removed at a time when the upper surface of the etch stop layer 3 is exposed.

According to a second embodiment of the present invention, a cap layer 5 is formed on the etch stop layer 3 by a method which will be described later. The method of the second embodiment is illustrated in FIGS. 2A through 2F, in which the like numerals depict like elements. Therefore, a description of the like elements is omitted, where appropriate.

Figure 2A:
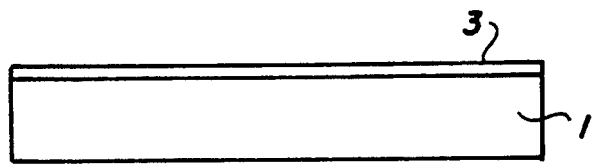
FIG. 2A is a cross-sectional view of an etch stop layer deposited on a silicon substrate according to a second embodiment of the present invention.

According to the method of the second embodiment, the etch stop layer 3 is first formed on the upper surface of the silicon substrate 1, as shown in FIG. 2A. The etch stop layer 3 is formed using the same techniques as were used in the first embodiment.

Figure 2B:
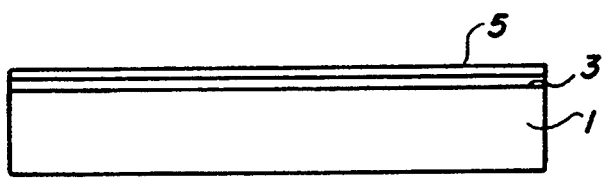
FIG. 2B is a cross-sectional view of the structure of FIG. 2A after a cap layer has been formed on the etch stop layer according to the second embodiment of the present invention.

Then, as shown in FIG. 2B, a cap layer 5 is formed on the etch stop layer 3, preferably epitaxially. The cap layer 5 is typically grown on the etch stop layer 3 at about 400° to about 1100° C. (e.g., typically about 500° to about 800° C. for MBE processes). The thickness of the cap layer 5 is 50 to 1000 nm, and more preferably 100 to 500 nm. The cap layer 5 has lower and upper opposing surfaces with the lower surface contacting the etch stop layer 3. The cap layer 5 is preferably a silicon cap layer 5.

Figure 2C:
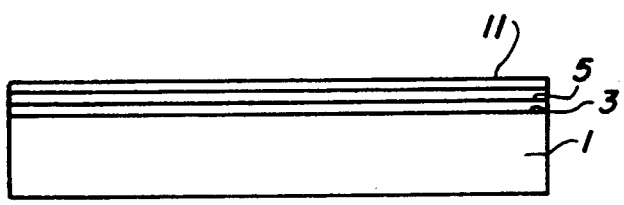
FIG. 2C is a cross-sectional view showing the structure of FIG. 2B after a mask has been deposited on the upper surface of the cap layer according to the second embodiment of the present invention.

It may be desirable to protect the upper surface of the cap layer 5 from damage possibly incurred in a later silicon substrate 1 removal step and subsequent steps. This can be done by a variety of conventional techniques including depositing a conventional mask layer 11 on the upper surface of the cap layer 5, as shown in FIG. 2C.

Figure 2D:
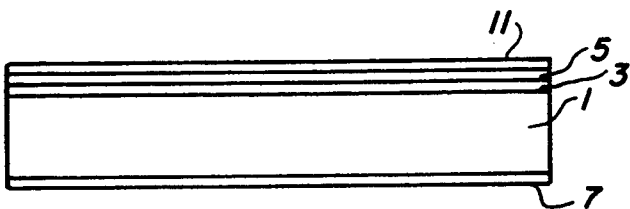
FIG. 2D is a cross-sectional view of the structure of FIG. 2C after a mask has been deposited on a lower surface of the silicon substrate according to the second embodiment of the present invention.
Figure 2E:
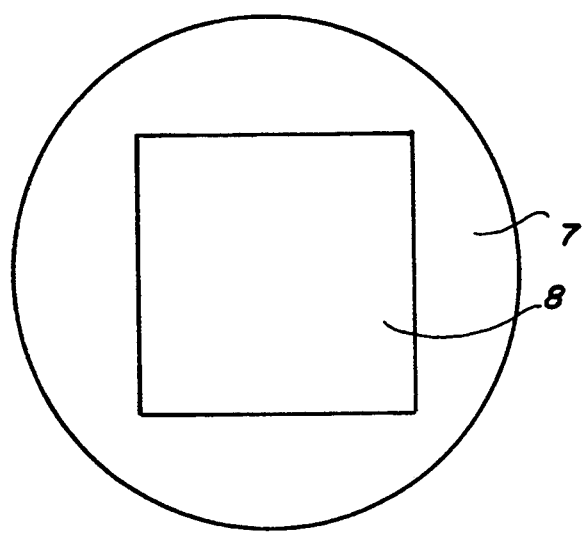
FIG. 2E is a bottom plan view showing the structure of FIG. 2D after a portion of the lower surface of the silicon substrate has been exposed through the mask according to the second embodiment of the present invention.
Figure 2F:
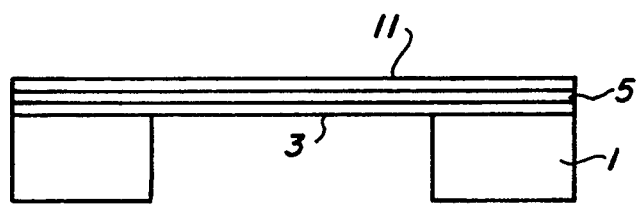
FIG. 2F is a cross-sectional view of the structure of FIG. 2E according to the second embodiment of the present invention.

Next, a portion of the silicon substrate 1 is removed in the same manner as described above in the first embodiment of the present invention and as shown in FIGS. 2D and 2E. As can be seen in FIG. 2F, removal of the portion of the silicon substrate 1 defines an exposed portion of the etch stop layer 3.

If the mask 11 is not used, the portion of the silicon substrate 1 is removed at a time when the upper surface of the cap layer 5 is exposed. However, if the mask 11 is used, then the cap layer 5 is covered when the portion of the silicon substrate 1 is removed. In this case, an upper surface of the mask 11 is exposed when the portion of the silicon substrate 1 is removed (in the same manner as described for the first embodiment).

Figure 2G:
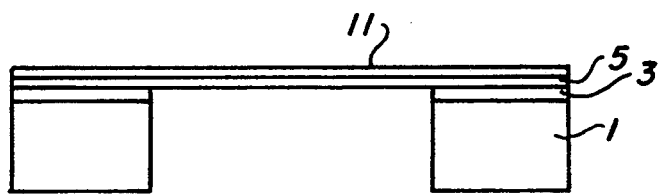
FIG. 2G is a cross-sectional view of the structure of FIG. 2F after an exposed portion of the etch stop layer has been removed according to the second embodiment of the present invention.

The exposed portion of the etch stop layer 3 can then be conventionally removed with the resulting structure shown in FIG. 2G. To remove the etch stop layer 3 a solution of nitric acid, hydrofluoric acid and water can be used, as described in Krist et al., "Selective Removal of a $Si_{0.7}Ge_{0.3}$ Layer From Si(100)", *App. , Phys. Lett.*, 58(17), 29 Apr. 1991 incorporated by reference herein in its entirety for all purposes. The etch stop layer 3 can also be left intact and not removed.

Figure 2H:
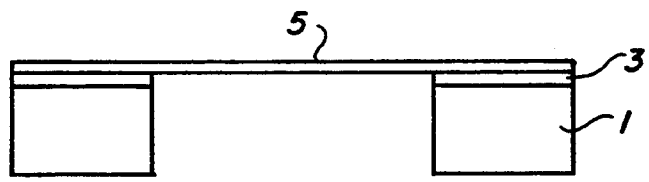
FIG. 2H is a cross-sectional view of the structure of FIG. 2G after the mask has been removed from the upper surface of the cap layer according to the second embodiment of the present invention.

Finally, the mask 11, if used, would be removed by conventional techniques. The resulting structure is shown in FIG. 2H.

Figure 3A:
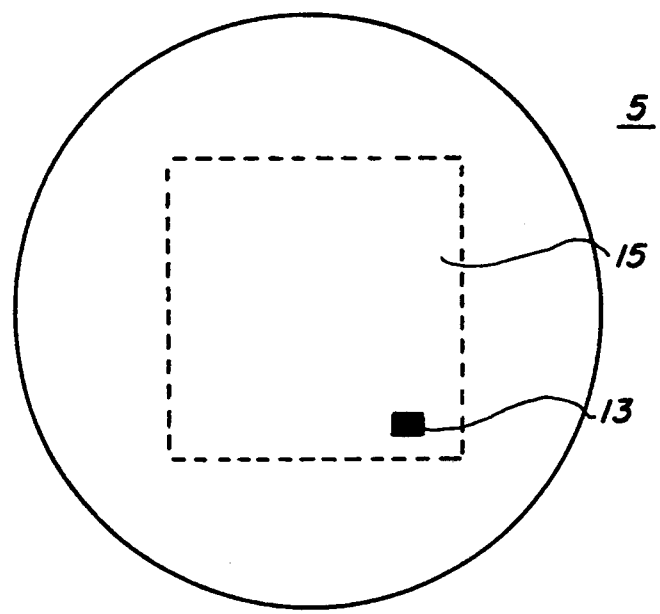
FIG. 3A is a top plan view of the structure of FIG. 2H showing the upper surface of the cap layer according to a modification of the second embodiment of the present invention.

A modification of the second embodiment of the present invention is directed to forming specialty electronic devices on the cap layer 5. FIG. 3A is a top plan view of the structure of FIG. 2H and shows the cap layer 5. The area within the dotted line is a membrane suspended by the silicon substrate 1. The silicon substrate 1 has been removed from under the area shown by the dotted line. Reference numeral 13 represents a silicon device area and a peripheral area of the cap layer 5. A fast transistor or a balometer can be formed on the silicon device area. Reference numeral 15 represents a remainder area of the silicon cap layer 5. That is, reference numeral 15 is all portions of the suspended membrane, the area within the dotted line, except the silicon device area and the peripheral area.

Figure 3B:
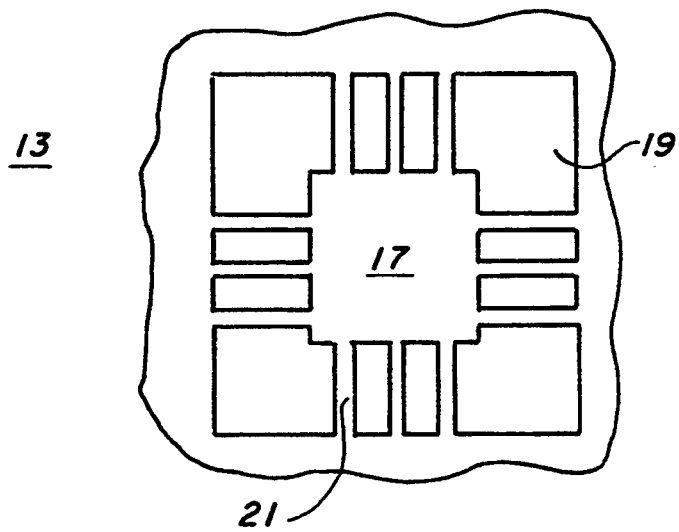
FIG. 3B is a view of the silicon device area and the peripheral area after a portion of the peripheral area has been removed according to the modification of the second embodiment of the present invention.

As can be seen from FIG. 3B, the silicon device area 17 is surrounded by the peripheral area 19. FIG. 3B is an enlarged view of the silicon device area and the peripheral area 19 of the silicon cap layer 5 of FIG. 3A after a portion of the peripheral area 19 has been removed. According to this modification of the second embodiment, a portion of the peripheral area 19 is removed by the same techniques in which the silicon substrate 1 was removed. That is, a mask of silicon oxide, silicon nitride or a metal, for example, is deposited and defined using conventional lithographic techniques, for example, a buffered oxide etch. Then, using a photoresist and conventional lithographic techniques the mask is defined. Then, the cap layer 5 is etched, as described above. The portion of the peripheral area 19 removed defines at least one connecting leg 21 of any shape and length which connects the silicon device area 17 to the remainder portion 15 (see FIG. 3A).

The device area is particularly appropriate for forming a balometer thereon. The device area provides low thermal mass and low thermal conductivity between the balometer and the supporting structure as well as electrical and mechanical isolation. These properties are ideal for balometers.

Numerous modifications and variations of the present invention are possible in light of the above teachings. It is therefore to be understood that within the scope of the appended claims, the invention may be practiced otherwise than as specifically described herein.

What is claimed is:

1. A method of producing a membrane, comprising the steps of:
   (a) forming an etch stop layer on an upper surface of a silicon substrate having upper and lower surfaces, the etch stop layer comprising an alloy of silicon and at least one other Group IV element, the etch stop layer having lower and upper surfaces with the lower surface contacting the silicon substrate; and
   (b) removing a portion of the silicon substrate with the upper surface of the etch stop layer exposed, the portion of the silicon substrate being removed extending from the upper surface of the silicon substrate to the lower surface of the silicon substrate.

2. The method of forming a membrane as recited in claim 1, wherein the etch stop layer comprises a silicon germanium alloy.

3. The method of producing a membrane as claimed in claim 1, wherein step (b) includes the substep of mechanically grinding or polishing the silicon substrate to remove all but 1–3 $\mu$m of the removed portion of the silicon substrate.

4. The method of producing a membrane as claimed in claim 1, wherein step (b) includes the sub-steps of:
   depositing a mask layer on the lower surface of the silicon substrate;
   removing a portion of the mask layer to define an exposed portion of the lower surface of the silicon substrate; and
   etching the exposed portion of the lower surface of the silicon substrate.

5. A method of producing a membrane, comprising the steps of:
   (a) forming an etch stop layer on an upper surface of a silicon substrate having lower and upper surfaces, the etch stop layer comprising an alloy of silicon and at least one other Group IV element;
   (b) forming a cap layer on the etch stop layer, the cap layer having lower and upper surfaces, the lower surface contacting the etch stop layer; and
   (c) removing a portion of the silicon substrate with the upper surface of the cap layer exposed, the portion of the silicon substrate being removed extending from the upper surface of the silicon substrate to the lower surface of the silicon substrate and defining an exposed portion of the etch stop layer.

6. The method of forming a membrane as recited in claim 5, wherein the etch stop layer comprises a silicon germanium alloy.

7. The method of producing a membrane as claimed in claim 5, further comprising the step of removing the exposed portion of the etch stop layer.

8. The method of producing a membrane as claimed in claim 5, wherein the cap layer is a silicon cap layer.

9. The method of producing a membrane as claimed in claim 5, wherein the cap layer is an epitaxial silicon cap layer.

10. The method of producing a membrane as claimed in claim 9, wherein the silicon cap layer has a thickness approximately of 10–500 nm.

11. The method of producing a membrane as claimed in claim 5, where in step (b) includes the substep of mechanically grinding or polishing the silicon substrate to remove all but 1–3 μm of the removed portion of the silicon substrate.

12. The method of producing a membrane as claimed in claim 5, wherein step (b) includes the steps of:
depositing a mask layer on the lower surface of the silicon substrate;
removing a portion of the mask layer to define an exposed portion of the lower surface of the silicon substrate; and
etching the exposed portion of the lower surface of the silicon substrate.

13. The method of producing a membrane as claimed in claim 5, further comprising the step of removing a portion of the mask layer to define an exposed portion of the lower surface of the silicon substrate.

14. A method of producing a membrane, comprising the steps of:
(a) forming an etch stop layer on an upper surface of a silicon substrate having upper and lower surfaces, the etch stop layer comprising an alloy of silicon and germanium;
(b) forming a silicon cap layer on the etch stop layer, the silicon cap layer defining a silicon device area and a peripheral area surrounding the silicon device area and having lower and upper surfaces, with the lower surface contracting the etch stop layer;
(c) depositing a mask layer on the lower surface of the silicon substrate;
(d) removing a portion of the mask layer to define an exposed portion of the lower surface of the silicon substrate;
(e) etching the silicon substrate to remove a portion of the silicon substrate extending from the exposed portion of the lower surface of the silicon substrate to the upper surface of the silicon substrate and defining an exposed portion of the etch stop layer, the portion of the silicon substrate being removed with the upper surface of the silicon cap layer exposed;
(f) removing the exposed portion of the etch stop layer; and
(g) removing a portion of the peripheral area of the silicon cap layer from the lower surface of the silicon cap layer to the upper surface thereof.

15. The method of producing a membrane as claimed in claim 14, wherein the silicon cap layer has a remainder portion surrounding the peripheral area and the peripheral area is removed to define at least one leg connecting the silicon device area to the remainder portion.

16. The method of producing a membrane as claimed in claim 14, further comprising the step of (h) forming a device on the silicon device area of the silicon cap layer.

17. The method of producing a membrane as claimed in claim 14, wherein the silicon cap layer is an epitaxial silicon cap layer.

18. The method of producing a membrane as claimed in claim 17, wherein the silicon cap layer has a thickness of approximately 10–500 microns.

19. A method of producing a membrane, comprising the steps of:
(a) forming an etch stop layer on an upper surface of a silicon substrate having lower and upper surfaces, the etch stop layer comprising an alloy of silicon and at least one other Group IV element;
(b) forming a cap layer on the etch stop layer;
(c) depositing a mask on the cap layer, the mask having lower and upper surfaces, with the lower surface contacting the cap layer; and
(d) removing a portion of the silicon substrate at a time when the upper surface of the mask is exposed, the portion of the silicon substrate being removed extending from the upper surface of the silicon substrate to the lower surface of the silicon substrate and defining an exposed portion of the etch stop layer.

20. The method of producing a membrane as claimed in claim 19, wherein the cap layer defines a silicon device area and a peripheral area surrounding the silicon device area, the method further comprising the step of (e) removing a portion of the peripheral area of the silicon cap layer from the lower surface of the silicon cap layer to the upper surface thereof.

* * * * *